2,877,091

DEHYDRATION OF DEUTERIUM OXIDE SLURRIES

Clarence F. Hiskey, New York, N. Y., assignor to the United States of America as represented by the United States Atomic Energy Commission No Drawing. Application July 24, 1945
Serial No. 606,889

2 Claims. (Cl. 23—14.5)

This invention relates to the separation of matter and more particularly to a novel method of separating liquid neutron moderator such as heavy water ($D_2O$) from a reactive composition comprising said liquid and intensely radioactive material.

It is known that a neutronically reactive composition such as a slurry or a solution of neutron fissionable isotopes (for example, $U^{233}$, $U^{235}$, and $94^{239}$) in heavy water or other liquid neutron moderator is capable of sustaining a nuclear fission chain reaction. Heat is evolved during the reaction and is removed by passage of a coolant through the reactive composition or in heat exchange relationship therewith. Specific details of the theory and essential characteristics of such reactors are set forth in the copending application of Eugene P. Wigner et al., Serial No. 613,356, filed August 29, 1945.

In one form of neutronic reactor with which the invention is particularly useful, the uranium-containing material is in the form of uranium oxide, such as $UO_2$, $UO_3$, or $U_3O_8$, or as a carbide or uranate. This uranium-containing material in a finely divided state, with a preferred original particle size below two microns, is suspended in the deuterium oxide or heavy water moderator to form a slurry or colloid which is circulated through the reactor and a heat exchange system. Because of abrasion between particles, the particle size will gradually diminish as the material circulates through the neutronic reactor and the circulatory system. If $UO_2$ is used, the preferred ratio by weight is one part oxide to four parts heavy water. On a volume basis, the oxide solids represent about 4 percent of the slurry volume.

The slurry is placed in a reaction tank of sufficient size to contain enough slurry to maintain a chain reaction and means are provided for withdrawing a portion of the slurry from the tank when the uranous material has received sufficient neutron bombardment to produce the desired amount of fission products and plutonium. The slurry solids must then be separated from the deuterium oxide for further processing during which the fission products and plutonium are finally separated. For several reasons, it is important that the separation of slurry solids from the deuterium oxide be conducted as quickly as possible. In the first place, as has been pointed out, considerable heat is evolved in the irradiated slurry, and it is an object of this invention to use this self-heat in the separation process. The self-heat if uncontrolled will cake the slurry making is difficult to handle and may even cause the slurry to reach a temperature at which it may damage the separation apparatus. It may also be desirable to recover the fission products before any substantial radioactive decay has occurred, so that these products may be used while in a highly radioactive state. Another reason for quick separation is the very high cost of deuterium oxide. A certain minimum amount of deuterium oxide must remain in the neutronic reactor, if the chain reaction is to continue. Therefore, the shorter the time of hold-up of the deuterium oxide outside the reactor while being separated, the smaller the amount of said oxide necessary for the entire system.

An object of this invention is to provide a novel method whereby radioactive solids in suspension or solution in a liquid may be quickly separated from said liquid.

Still another object of the present invention is to provide a method and apparatus whereby uranium-containing solids in suspension or solution in deuterium oxide may be quickly and efficiently separated from said deuterium oxide.

It may be noted that the rate at which heat is produced by the irradiated composition is dependent upon the power value at which the neutronic reactor is operated and also upon the length of time elapsing between termination of the nuclear fission chain reaction and treatment of the reactive composition to separate the liquid neutron moderator from the radioactive solids. In most cases, it is desirable for the reasons above set forth to separate the moderator and the radioactive solids almost immediately upon termination of the chain reaction in the composition to be treated, and inasmuch as a reactor such as that above described may be operated at power values up to 1,000,000 kilowatts, it will be understood that in the absence of cooling means the reactive material is capable of heating itself after termination of the chain reaction therein to temperatures considerably in excess of 1200° C., thereby greatly complicating the handling of this material as above discussed.

In processes heretofore utilized for separating the liquid neutron moderator and the radioactive solids in the reactive composition, the separated solids are in a substantially dry condition. These dry solids as discussed above generate heat at a rapid rate and must be cooled in order to prevent damage to the associated apparatus; and it is, therefore, an object of the invention to provide a medium having good heat transfer characteristics to facilitate cooling of the reactive material after the liquid neutron moderator has been separated therefrom.

In accordance with the invention, the reactive composition which is withdrawn from the reactor tank is saturated with an anhydrous fusible salt mixture, such as the potassium nitrate-sodium nitrite eutectic, the potassium chloride-sodium chloride eutectic, any one of the above-mentioned compounds per se or mixtures thereof, or any salt having desirable heat transfer characteristics and a melting point substantially higher than the boiling point (approximately 100° C.) of heavy water. As further examples of other suitable salt mixtures there may be mentioned eutectic mixtures of barium, potassium, and sodium chlorides; strontium and barium bromides; strontium iodide and strontium bromide, strontium bromide and barium iodide; calcium and sodium chlorides; barium and strontium iodides; and strontium iodide and barium bromide.

The salted composition is then conducted into any conventionel boiling device comprising cooling means such as a coolant coil or a heat exchange circulatory system for maintaining the composition therein at any predetermined temperature value above 100° C. The composition is then allowed to heat by its self-heat or is externally heated to a temperature slightly in excess of 100° C. thereby causing the heavy water to evaporate. The vapor is conducted to a conventional condenser, and the condensate is returned to the reactor tank as desired.

After the heavy water in the composition has been substantially completely evaporated, the composition is permitted to heat or is externally heated to a temperature substantially in excess of 100° C. at which temperature the salt additive fuses with the result that the radioactive solids are slurried in a fused salt bath. The salt bath possesses excellent heat transfer properties, and thus the temperature of the dehydrated composition may be readily controlled in the manner above described.

In one example of the novel process, a slurry of uranium trioxide and heavy water was saturated with an anhydrous potassium nitrate-sodium nitrite mixture and was maintained at a temperature of approximately 100° C. whereupon all of the free water was evaporated. However, the water of hydration remained bound to the uranium trioxide and fixed in the slurry until reaction of the uranium trioxide with the slats occurred at a temperature range of about 300°–400° C. This reaction resulted in the formation of a slurry of sodium and potassium uranates in the fused salt bath, with the water of hydration being immediately expelled.

It will be understood that the fused salt bath and the uranium-containing solids therein may be dropped into a stream of cold running water thereby leaching the unreacted salts and leaving an insoluble residue of the uranium compounds. This residue may be removed by any one of a number of conventional techniques and processed to recover plutonium and fission products of the nuclear fission chain reaction. The dissolved salts may be completely dehydrated by boiling or any one of the techniques well known in the art and after being put in an anhydrous condition may be reused in the process.

In another example of the invention the radioactive slurry of heavy water and uranium oxide particles is mixed with an anhydrous aromatic compound having a boiling point substantially higher than 100° C. Examples of such compounds are diphenyl, 1,4-dibromobenzene, chloronaphthalene, naphthalene, and chlorinated benzene or chlorinated naphthalene. The slurry is maintained at a temperature of approximately 100° C. until the heavy water is substantially completely evaporated. The dehydrated composition is then maintained at a temperature at which tthe particular additive compound is liquid and is thus an effective heat transfer agent, thereby facilitating cooling of the radioactive uranium-containing particles in the manner above described.

It will be understood that while the above-discussed examples disclose the invention in its narrower aspects as applied to heavy water compositions to which the novel process is particularly adapted, the invention in its broader aspects comprehends a method of removing any liquid neutron moderator such as, for example, ordinary water from a neutronically reactive composition by contacting such composition with a liquid or liquefiable substance having good heat transfer characteristics, while maintaining the composition at a temperature above the boiling point of the moderator and below the boiling point of said substance whereby the latter may be utilized in its liquid state as a heat transfer agent to effectively cool the reactive solids remaining after the neutron moderator has evaporated from the composition.

While the theory of nuclear reactions set forth herein is based on the best presently known experimental evidence, the invention is not limited thereto, as additional experimental data later discovered may modify the theory disclosed. Any such modification of theory, however, will in no way affect the results to be obtained in the practice of the invention herein described and claimed.

Obviosuly, many modifications may be made in the specific embodiments disclosed without departing from the intended scope of the invention.

What is claimed is:

1. A method of recovering heavy water and uranium-containing material from a neutronically reactive slurry of heavy water and colloidal particles of a uranium oxide comprising saturating said slurry with a potassium nitrate-sodium nitrate mixture, then maintaining said slurry at a temperature of approximately 100° C. until the free heavy water is substantially completely evaporated from said slurry, and then maintaining said slurry within a temperature range of the order of 300°–400° C., whereby said mixture is fused and said particles react therewith thereby expelling the water of hydration from said particles, and recovering said evaporated and expelled heavy water and said uranium-containing material.

2. A method of recovering heavy water and uranium-containing material from a slurry of heavy water and particles of uranium-containing material, comprising saturating said slurry with a fusible, anhydrous salt, then maintaining said slurry at a temperature of approximately 100° C. until the free heavy water is substantially completely evaporated from said slurry, and then maintaining said salt within a temperature range of the order of 300°–300° C., whereby said salt is fused and combines with said particles to expel the water of hydration therefrom, and recovering said evaporated and expelled heavy water and said uranium-containing material.

References Cited in the file of this patent
UNITED STATES PATENTS

| 2,394,244 | Kokatnur | Feb. 5, 1946 |
| 2,849,284 | Wigner et al. | Aug. 26, 1958 |

OTHER REFERENCES

Copisarow: Dehydration of Salts, Nature, vol. 128 page 838 (1931).